April 20, 1954  J. H. F. KENT  2,675,582
MOLD FOR TIRES
Filed Feb. 24, 1948  5 Sheets-Sheet 1
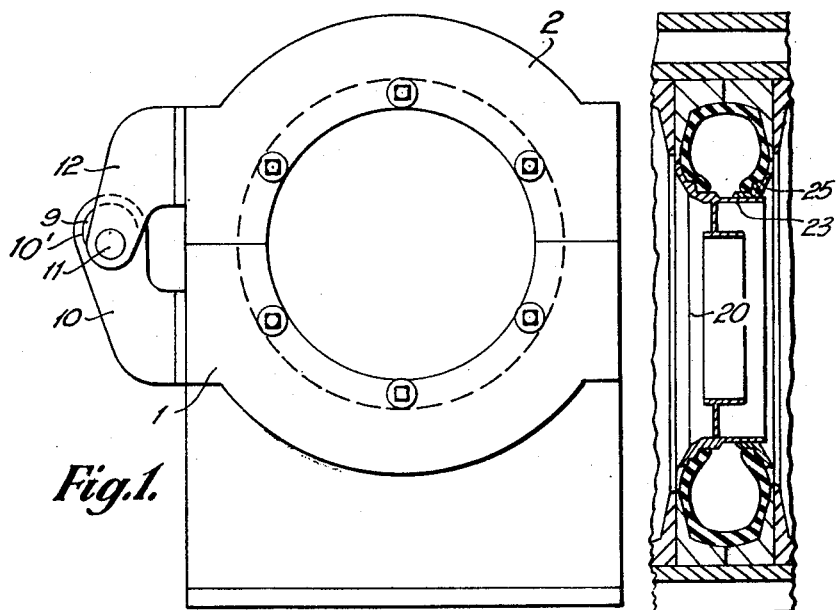
Fig.1.
Fig.3.
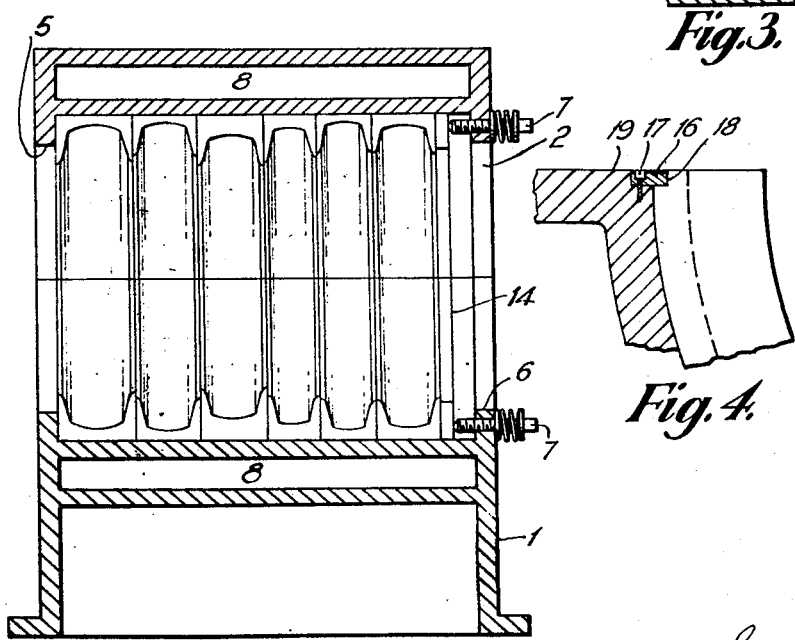
Fig.2.
Fig.4.
Inventor
Jan H. F. Kent,
By his attorneys:
Baldwin, Wight & Prevost April 20, 1954    J. H. F. KENT    2,675,582
MOLD FOR TIRES Filed Feb. 24, 1948    5 Sheets-Sheet 2

Patented Apr. 20, 1954

2,675,582

UNITED STATES PATENT OFFICE 2,675,582

MOLD FOR TIRES

Jan Herbert Farquharson Kent, Basingstoke, England, assignor of one-half to Auto Tyre Services Limited, Basingstoke, England, a company of Great Britain Application February 24, 1948, Serial No. 10,245
In Great Britain December 3, 1947

Section 1, Public Law 690, August 8, 1946
Patent expires December 3, 1967

3 Claims. (Cl. 18—18)

This invention relates to treading apparatus for tyres and is a continuation in part of my prior application Serial No. 717,829, filed December 23, 1946, now Patent No. 2,598,841. It is particularly concerned with an improved vulcanising apparatus for simultaneously retreading a number of tyres.

One difficulty experienced in the curing of tyres which applies both to the manufacture of a new tyre and to a "retread" is that of removing the tyre after vulcanisation from the matrix, which is enhanced by the intricate nature of the pattern on the tread of the tyre causing the tyre surface to adhere to the mould.

This invention has for its object an improved apparatus for loosening or detaching a tyre from the matrix after the retreading or other vulcanising operation is completed.

In presses where the upper and lower halves or sections of the mould or press separate about a medial plane at right angles to the axis of the tyre and dividing the mould into two circular portions it has been proposed to provide means to facilitate stripping of the tyre from the press. Thus in a press or mould in which the mould upper and lower sections divide about a medial plane of the tyre, after a slight separation of the mould sections, a relative movement thereof is effected mechanically in a transverse direction at right angles to the axis of the tyre to effect "stripping" of the tyre, release of the tyre taking place on continued opening of the press.

One object of the invention is to simplify the action of stripping the tyre from its matrix which we have found can more satisfactorily be performed by utilising a matrix consisting of two substantially semi-circular sections that make joint about a diametral plane of the tyre, that is a plane passing through or closely adjacent the centre of the tyre circle.

Another object of the invention is to provide an improved design of mould chest capable of treading a number of tyres simultaneously and wherein the step of opening up the mould on completion of the vulcanisation operation is performed automatically, the tyres being stripped from their supporting matrices as the mould opens.

According to the present invention, moulding apparatus suitable for use when retreading tyres comprises a mould chest formed in two sections hingedly connected to one another by a hinge connection, which is rotatable about an axis eccentric thereto, said sections being adapted to receive complementary tyre matrix portions, each of which is shaped to embrace part of the circular periphery of a tyre to be treaded, the two matrix portions and their supporting mould sections being constructed to make joint in a plane transverse to the plane of the circular periphery of the tyre whereby on angular movement of the hinge connection about said eccentric axis, the mould sections with their matrix portions may be relatively displaced in a direction generally parallel to the joint plane so as to produce a peeling action of the tyre around its circumference on opening the mould chest.

The mould opening means preferably includes means to rotate the eccentric mounting through an angle sufficient to bring about a relative displacement of the mould sections and means adapted on displacement of the mould sections to swing the opening section about its hinge proper.

In operation it will be found that when the mould chest containing the tyre matrix or matrices is opened up to remove the tyre or tyres therewithin, the latter will be subjected to a peeling or stripping action commencing at two opposite points on the circumference of the tyre.

The invention is illustrated in the accompanying drawings in which:

Fig. 1 is an end view of a moulding apparatus (with matrices removed) constructed in accordance with a preferred embodiment of the invention, Fig. 2 being a longitudinal section thereof but showing the matrices in position.

Fig. 3 is a part-sectional view on an enlarged scale showing a matrix with its associated tyre supporting frame.

Fig. 4 is a section of a detail.

Figure 5:
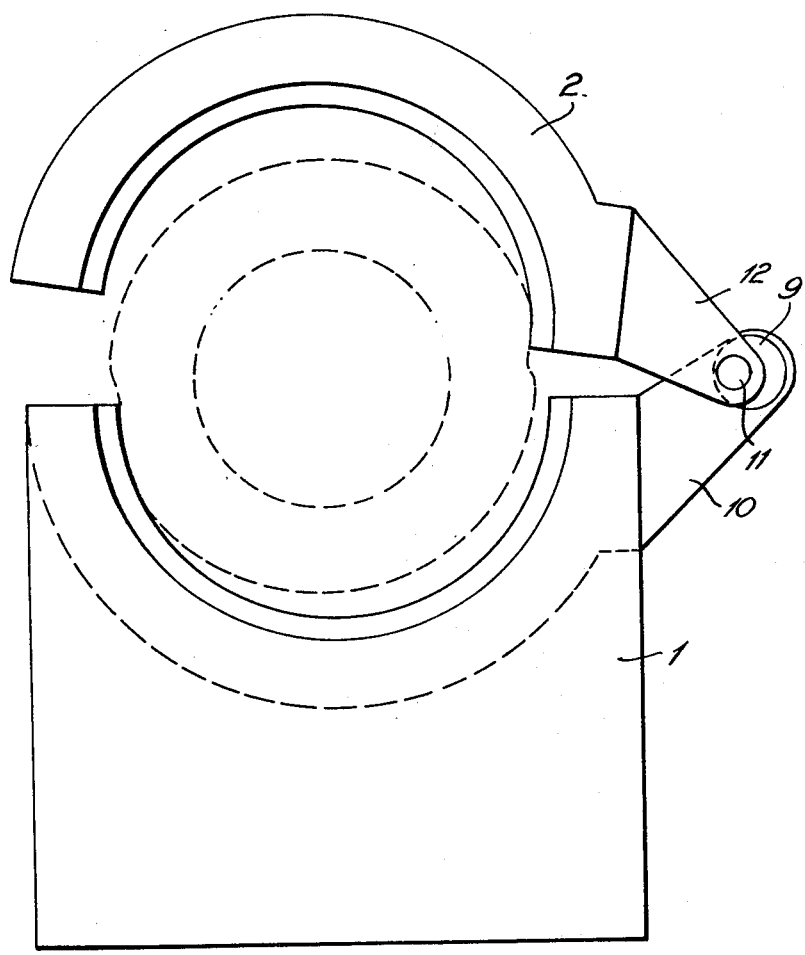
Fig. 5 is an end view illustrating the action of the mould when being opened and ejecting the tyre.

Referring to the accompanying drawings the vulcanising apparatus consists of a two part mould supporting chest providing a heating chamber including a base section I which constitutes the lower and stationary section of the mould chamber, the other and upper section 2 operating as a closing section, which in the closed position clamps down and makes joint with its base and complementary section I. The space enclosed between the two sections of the mould chest is cylindrical and houses the moulds proper termed the matrices used for retreading old tyres. Each matrix is usually as shown in two semi-circular portions and embraces part of the circular periphery of the tyre.

The cylindrical chamber includes end flanges 5 and 6 of sufficient depth to receive and locate the matrices endwise, of which there may conveniently be six as shown in Fig. 2. At one end of the chamber, the flanges are provided with set screws 7 for holding the matrices, when in position, firmly clamped to one another as hereinafter described. The circumferential walls of the chamber are hollow as indicated at 8 so as to provide passages for the flow of the heating medium, usually steam, the passages being provided with steam connections, not shown.

When in the closed position shown in Figs. 1 and 2 the cover section 2 is in correct registration with the lower stationary section of the mould chest.

The meeting faces or the plane about which the mould cover 2 when closed makes joint with its lower half 1 is for convenience of handling a horizontal transverse to the plane of the circular periphery of the tyre. In the construction shown this plane is coincident with the centre line of the mould chest and of the half matrices contained within the mould chest.

The two sections of the mould chest, with the tyre matrix portions supported therein are hinged to one another by means of an eccentrically operating hinge as indicated in Fig. 1. The hinge proper for the opening section 2, indicated at 11, is journalled eccentrically in shaft 9 to rotate in bearings 10' formed in arms 10 on the lower section of the heating chamber. The hinge pin 11 at each end of the mould chest about which the mould cover 2 is mounted to swing, when opened, by the arms 12, are themselves integral with a shaft 9, extending the entire width of the mould chest or two short shafts mounted to rotate in the bearings 10' in the arms 10 or a part of the mould bed.

It will be seen therefore that by reason of the eccentricity of the hinge pins 11 in relation to the axis of shaft 9, any angular displacement of the shaft 9 will produce a relative movement between the mould sections with the result that the cover 2 will be displaced diametrially, that is in a direction generally parallel with the joint plane. By suitable selection of the eccentricity and the angle through which shaft 9 is turned, it is possible to move one half of the tyre matrix contained in 2 in relation to the other half which will give rise to a peeling action around its circumference at the tread, producing a gradual separation of the tyre from its matrix as the mould cover is raised about its hinge 11.

The set screws 7, by which the matrices are held in position are spring-loaded and are adjustable. The ends of the screws bear on a pressure plate 14. To prevent the matrices from shifting circumferentially in the respective sections of the mould chest, the latter may be provided with keys 16 (see Fig. 4) each key being detachably secured by a set screw 17 in a recess 18 cut in the separating faces 19 (see Fig. 4) of the lower half of the mould. These keys engage a corresponding recess in the meeting faces of the matrix and it will be understood that a similar set of keys and recesses is provided in the upper or closing half of the chest.

In operation, in order to free the tyre from the matrix on completion of the vulcanisation operation, it is sufficient to effect an angular movement of each hinge pin 11 about its eccentric axis which will automatically cause the mould cover 2 and the matrix portion it supports to shift relatively to their opposite (bottom) sections along their meeting faces at the joint plane. This will cause the tyre to commence to peel away from the inner face of the matrix at two opposite points on its circumference, and therefore as the matrix is opened the tyre will automatically continue to strip away from the retaining surfaces of the mould. Such an arrangement will be found to effect a considerable saving in labour and, furthermore, the quality of the retread or tyre is improved since there is less damage to the tread pattern as the tyre is stripped from the mould.

Figure 6:
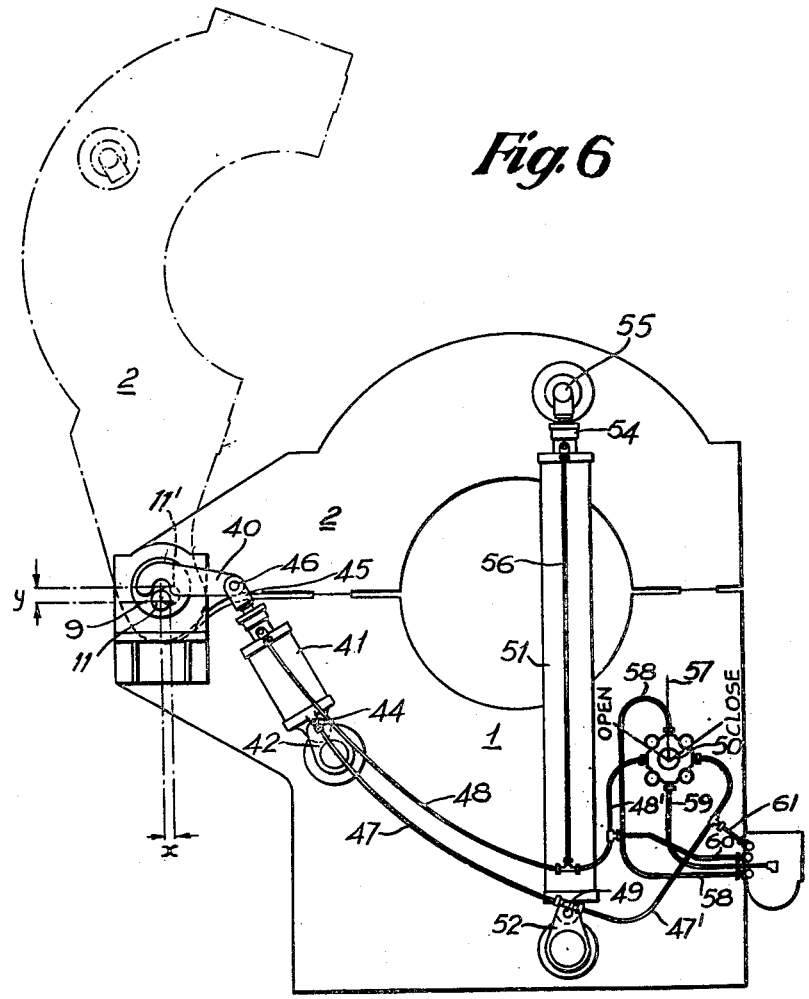
Fig. 6 is an end view of the mould showing the eccentric actuating mechanism.
Figure 7:
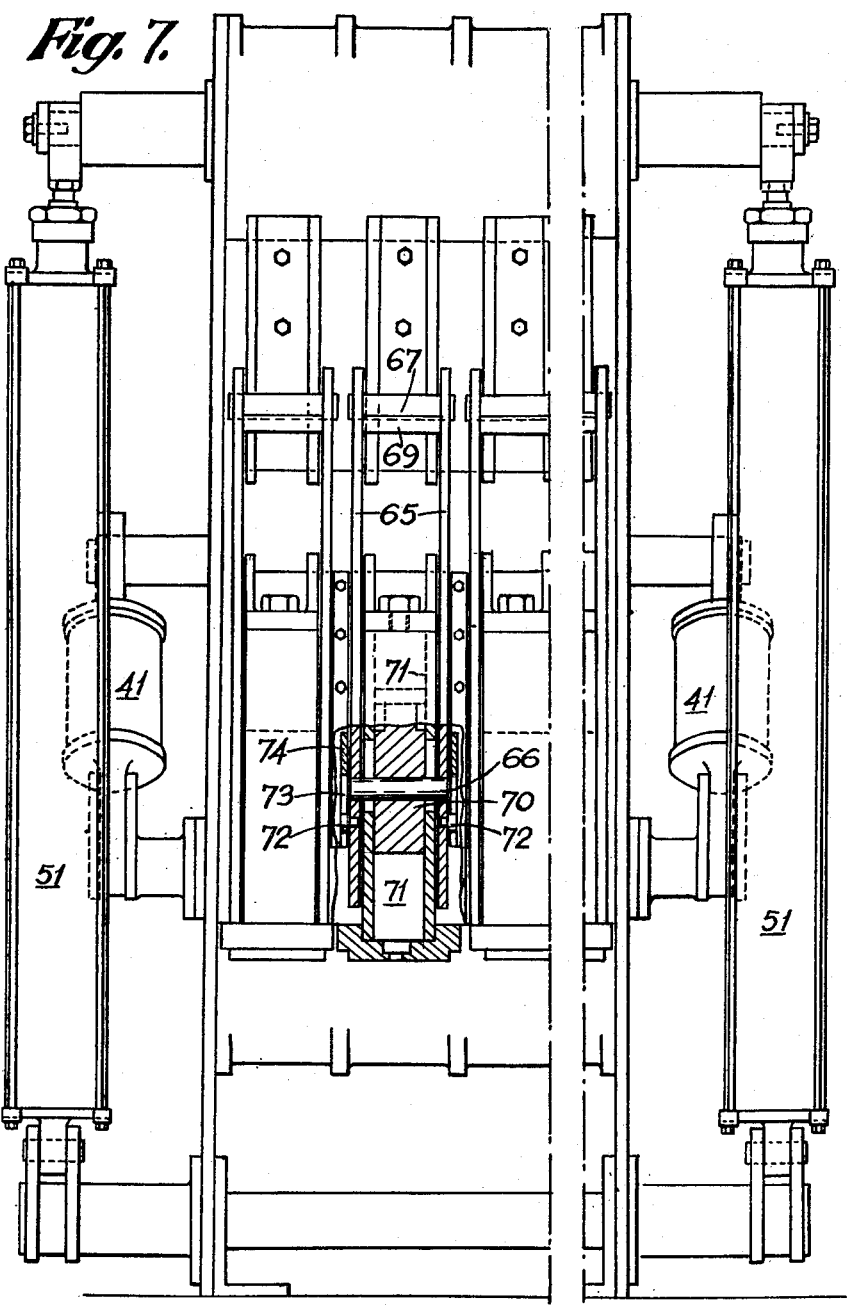
Fig. 7 is a front view of the mould of Fig. 6 showing both the actuating mechanism for opening and closing the cover section of the mould and the locking device for holding the two sections of the mould tight closed during the vulcanisation operation.

Mechanism for actuating the eccentric hinge is shown in Figs. 6 and 7 in which shaft 9 has connected to it a lever arm 40, this arm 40 being movable through a predetermined angle so as to provide a displacement of the hinge pin 11 of the mould cover 2 within the maximum available by the eccentricity and which takes place before the latter is swung about its pivot when opening up the mould. As is clearly indicated in Fig. 6, rotation of the shaft 9 through an angle of 45° will produce a relative displacement between the meeting faces of the mould and the matrix sections within equal to the distance X, which can however be varied with the angle through which shaft 9 is rotated. For most purposes an angular displacement of 45° will be found sufficient, but obviously this will depend upon the eccentricity of the pin 11, i. e. the dimension Y.

In the construction shown, the eccentric actuating lever 40 is operated hydraulically by means of a two-way ram displaceable in a cylinder 41, one end of the cylinder being mounted on a trunnion mounting comprising arms 42 supporting a trunnion pin 44. The rod of the hydraulic ram 45 is coupled at 46 to the lever arm 40. Fluid pipes 47, 48, respectively connect opposite sides of the ram to a control valve indicated generally at 50.

The hinging movement of the cover 2 of the mould is similarly controlled by means of a hydraulic ram 51 supported at one end on a similar trunnion mounting comprising arms 52, the piston 54 of the ram being pivotally connected at 55 to the top half 2 of the mould. For convenience in operation, fluid pressure is transmitted to the ram 51 by means of pipe lines common with the supply lines 47, 48, the pipe line 47 being connected at 49 to one end of the cylinder 51 of the ram while the line 48 is connected through a fixed pipe 56 to the opposite end of the cylinder: 58 indicates the main pressure supply line to valve 50.

In operation, when it is desired to open the mould the valve lever diagrammatically indicated at 57 is moved to the position marked "open" when fluid pressure from the main water supply line 58 will be admitted to the extension 47' of the pipe line 47 to admit fluid pressure to the hydraulic rams 41, 51, the arrangement being such that the ram 41 will operate first to rock the eccentric shaft 9 through an angle of 45° and so bring about a displacement of the mould cover 2 in relation to the mould bottom and following which the ram 51 will operate to raise the cover 2 until it assumes the position shown, this hinging movement taking place about its hinge pin 11 which will now be in the dotted line position indicated at 11' in Fig. 6.

The reverse sequence of operations takes place when the lever 57 is moved to the position marked "closed" when fluid pressure will be transferred via the pipe line 48' to 48 and 56 respectively, simultaneously with which movement of the valve, pipe lines 47, 49, will be open through 47' to the exhaust 59. It will be noted that the pressure lines 47', 48' are respectively connected through branch pipes 60, 61 leading to a second opening cylinder similar to 51 and situated at the opposite end of the mould.

In order to ensure that the eccentric actuating ram shall operate first, the loading of the respective cylinders is such that whereas cylinder 41 operates at about 100 lbs. square inch pressure, cylinder 51 has not sufficient power to open the mould until the pressure has built up to near 250 lbs. square inch, which does not occur until 41 has finished its stroke. This arrangement has the added advantage that most of the weight of the top half of the mould is taken off the surfaces where the two halves meet, thereby reducing friction at those points, which in turn allows the eccentric to work more easily and saves wear.

It will be understood that when the mould cover starts to lift under the action of its ram 51, carrying with it the upper halves of the matrices, the tyres are left sitting in the lower halves of the matrices, but stripped from them. This factor is of major importance, for if the tyres remained unstripped from the lower halves of the matrices, it would be almost impossible to remove them without damage to the treads.

Figure 8:
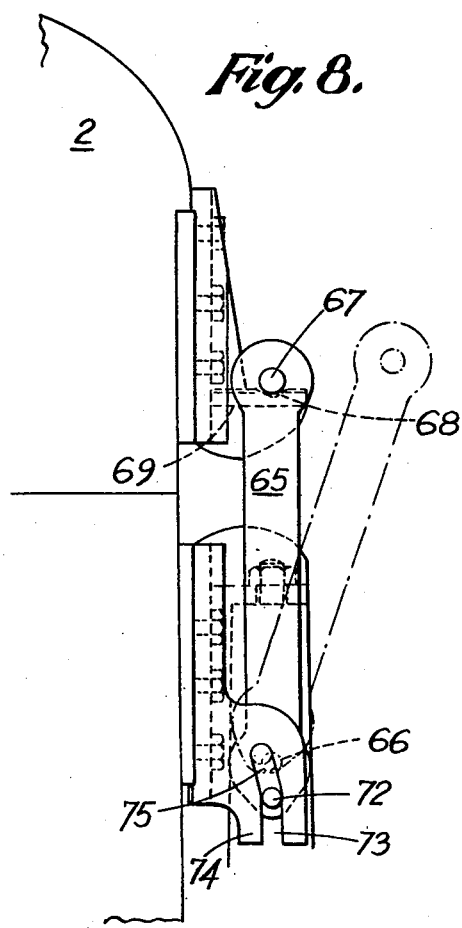
Fig. 8 is a detail view.

Referring now to Figs. 7 and 8 means is provided to prevent the two sections of the mould chest from separating during the vulcanising operation. For this purpose there may be fitted along the meeting edges of the upper and lower sections of the mould chest a series of clamp elements operable by hand, or in mould chests for handling the larger sizes of tyres, by hydraulic means.

These clamp elements consist of a series of double armed latch members 65 anchored to swing about power actuated pins 66 located on the stationary section of the mould chest. Fastened to the outer ends of latch arms 65 is a stirrup 67 adapted to enter a recess or seat 68 on a bracket 69 carried by the opening section 2 of the mould chest. Each fulcrum pin 66 operates as a trunnion, being mounted in a double acting ram 70 displaceable in a cylinder 71.

In each arm 65, on the lower side of fulcrum 66 is a guide projection or roller 72 in engagement with a slot 73 formed in lugs 74, each slot 73 having an inclined portion 75, which operates as a cam to disengage the arms 65 from the brackets 69.

When the arms 65 are in the dotted line position of Fig. 8, the rollers 72 are at the inner and top end of the inclined portion 75. On admission of hydraulic pressure to the upper side (see Fig. 7) of the ram the latter will be forced downwardly, carrying with it the pin 66, about which the arms 65 will fulcrum by reason of the rollers 72 moving down the inclined portion and into the slot proper 73, when the stirrup 67 will be vertically above its recess 68 in bracket 69. Continued movement down the slot 73 will tighten the pressure on the opening section 2 of the mould chest.

It will also be understood that, except as claimed, the invention is in no way restricted to the hydraulic method of actuating the eccentric hinge and opening movement of the mould cover and any means may be employed whether manually or power operated, which will automatically rotate the hinge pin so as to produce a relative displacement X of the mould sections along their meeting faces previous to swinging the opening half of the mould to open.

What I claim is:

1. In mechanism for clamping the relatively fixed and relatively movable sections of tyre moulding apparatus together having a seat on one section and a bracket on the other section, a latch arm having a part adapted to be engaged in said seat, a slot in said bracket, a guide projection on said latch arm extending into said slot, a pin connected to said latch arm and spaced from said guide projection longitudinally of said latch arm, and power actuated means for slidably moving said pin selectively relatively towards and from said seat, said slot having a portion inclined with respect to a line joining said guide projection and said latch arm part and another portion substantially parallel to such a line, whereby upon driving of the pin in a direction away from said seat, said arm will be swung about said pin to position said arm part for engagement with said seat and will then be translated to press said arm part in said seat.

2. In mechanism for clamping the relatively fixed and relatively movable sections of tyre moulding apparatus together having a seat on one section and a bracket on the other section, a latch arm having a part adapted to be engaged in said seat, a slot in said bracket, a guide projection on said latch arm extending into said slot, a pin connected to said latch arm and spaced from said guide projection longitudinally of said latch arm, and a hydraulic ram for slidably moving said pin selectively relatively towards and from said seat, said slot having a portion inclined with respect to a line joining said guide projection and said latch arm part and another portion substantially parallel to such a line, whereby upon driving of the pin in a direction away from said seat, said arm will be swung about said pin to position said arm part for engagement with said seat and will then be translated to press said arm part in said seat.

3. In moulding apparatus adapted for use in treading tyres, a mould structure consisting of two separable sections, one being a fixed section and the other being a moving section, each of said sections including a semi-cylindrical structure for mounting a plurality of tyre matrix halves of any size and being adapted to meet on a plane which is diametral with respect to said sections and associated matrix halves, a bearing fixed with respect to one of said sections, means mounted to rotate in said bearing about an axis substantially parallel to said diametral plane, hinge means mounted on said rotatably mounted means eccentric to the axis of rotation thereof; and operating means comprising a first hydraulic ram and connections between said ram and said rotatably mounted means for rotating said rotatably mounted means through a predetermined angle to effect a relative displacement of said sections and matrix halves at two oppositely spaced points on the circumference, one of which is at the breaking point of the matrix halves by which the peeling of the tyre is started at that point, a second hydraulic ram and connections between said second ram and said moving section operable on such relative displacement of said sections to swing the moving section about the axis of said hinge means to complete the peeling operation circumferentially of the matrix, and means for subjecting said rams substantially simultaneously to hydraulic pressure, the operating and pressure responsive characteristics of said rams being such that the first ram operates to rotate the rotatably mounted means before the second ram operates to swing the hinged section about the hinge axis.

References Cited in the file of this patent

UNITED STATES PATENTS

| Number | Name | Date |
|---|---|---|
| 1,887,251 | Stricklen et al. | Nov. 8, 1932 |
| 2,000,406 | Michelson | May 7, 1935 |
| 2,088,130 | Broering et al. | July 27, 1937 |
| 2,308,977 | Iverson et al. | Jan. 19, 1943 |
| 2,474,542 | McCloud et al. | June 28, 1949 |

FOREIGN PATENTS

| Number | Country | Date |
|---|---|---|
| 609,319 | Great Britain | Sept. 29, 1948 |